United States Patent [19]
Bartos et al.

[11] Patent Number: 5,704,750
[45] Date of Patent: Jan. 6, 1998

[54] MULTIPLE USE SCREW WITH TAPERED THREADS

[75] Inventors: Christopher James Bartos, Rochester Hills; Albert James Dapoz, Sterling Heights; Richard Joseph Rozmus, Wayne; Martin Arthur Trapp, Livonia, all of Mich.; Barry James Hughes, Gloucester, Mass.

[73] Assignee: Ford Global Technologies, Inc., Dearborn, Mich.

[21] Appl. No.: 783,724

[22] Filed: Jan. 16, 1997

[51] Int. Cl.$^6$ ............................... F16B 35/04
[52] U.S. Cl. ............... 411/411; 411/414; 411/426
[58] Field of Search ................... 411/426, 411, 411/366, 301, 302, 84, 386, 414, 907, 908

[56] References Cited

U.S. PATENT DOCUMENTS

| | | |
|---|---|---|
| 1,394,608 | 10/1921 | Davern . |
| 1,756,186 | 4/1930 | Fenton ........................ 411/426 |
| 3,030,997 | 4/1962 | Collins ........................ 411/301 |
| 3,083,609 | 4/1963 | Lovisek . |
| 4,472,098 | 9/1984 | Kiefer ......................... 411/411 |
| 4,595,325 | 6/1986 | Moran et al. . |
| 4,606,688 | 8/1986 | Moran et al. . |
| 4,750,851 | 6/1988 | Thomey ....................... 411/301 |
| 4,790,702 | 12/1988 | Maganias . |
| 5,098,237 | 3/1992 | Harker . |
| 5,131,204 | 7/1992 | Hiendl ......................... 411/366 |
| 5,141,376 | 8/1992 | Williams ...................... 411/411 |
| 5,252,016 | 10/1993 | Schmid ........................ 411/426 |

FOREIGN PATENT DOCUMENTS

| | | | |
|---|---|---|---|
| 213464 | 3/1958 | Australia ...................... 411/413 |
| 88366 | 9/1983 | European Pat. Off. ............ 411/411 |
| 598490 | 10/1959 | Italy .......................... 411/413 |
| 316627 | 8/1929 | United Kingdom . |
| 2235744 | 3/1991 | United Kingdom . |

*Primary Examiner*—Flemming Saether
*Attorney, Agent, or Firm*—David B. Kelley; Roger L. May

[57] ABSTRACT

A threaded screw has a first segment adjacent the screw head (10) with nontapered sides for engaging metal automotive fastener clip nuts (30) and a second segment with tapered sides for engaging plastic bosses (24). The second segment is adjacent the first segment but distant from the screw head (10). A single set of threads (36) is used for both the metal clip nut (30) and the plastic boss (24). The threads (36) have a helical pitch angle (P) of about nine degrees and form a flank angle ($\beta$) of about thirty degrees relative to a horizontal axis (20) of the screw. The screw taper matches the taper of the boss opening (22) to promote even stress distribution.

6 Claims, 3 Drawing Sheets

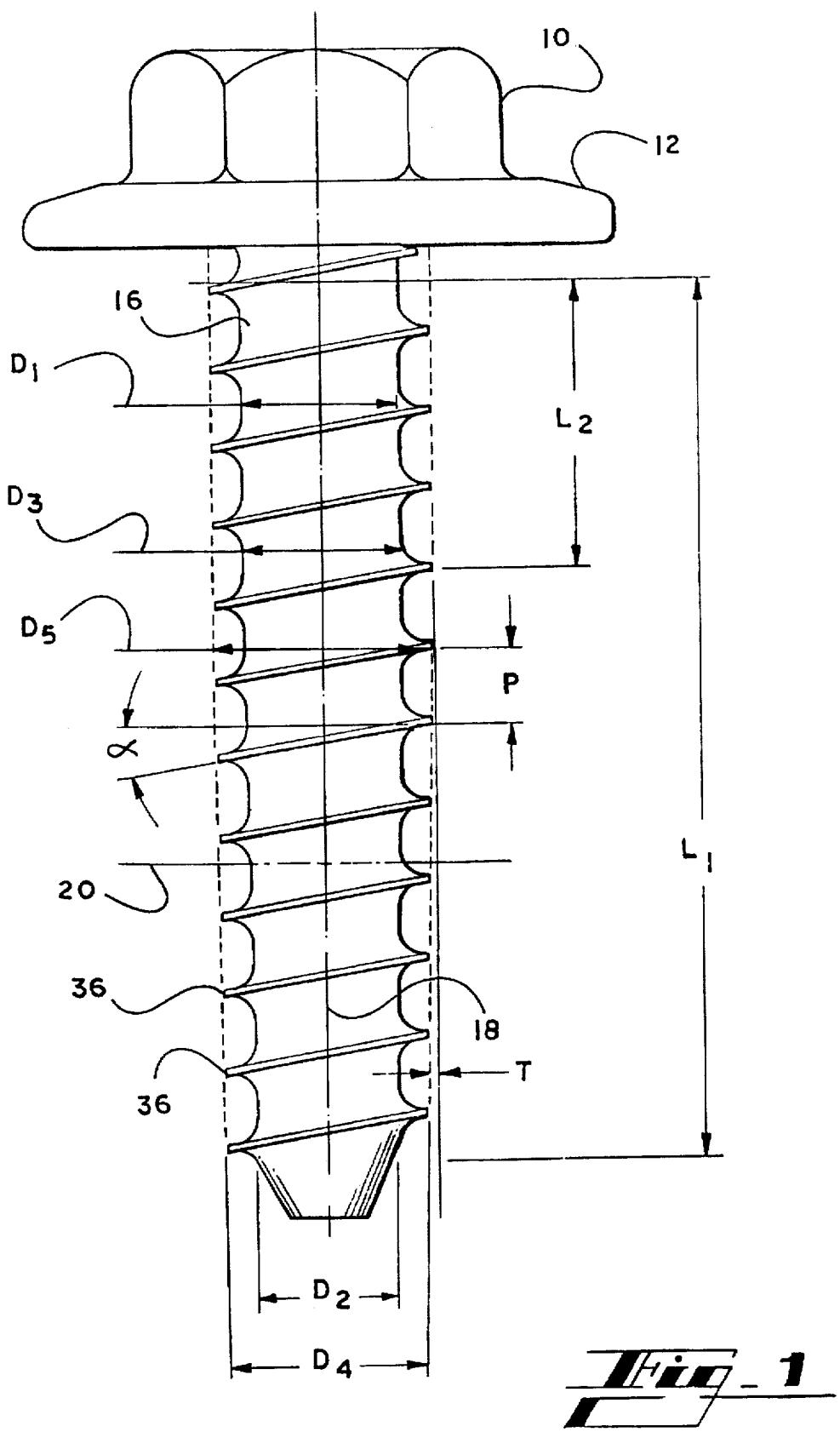
Fig_1

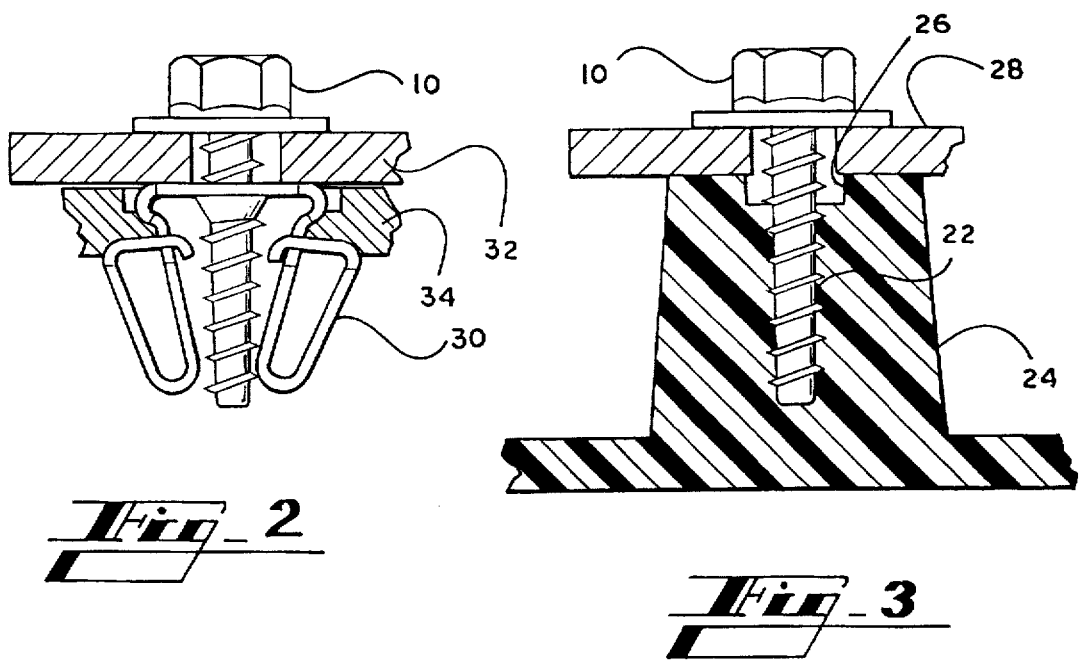
Fig_2
Fig_3
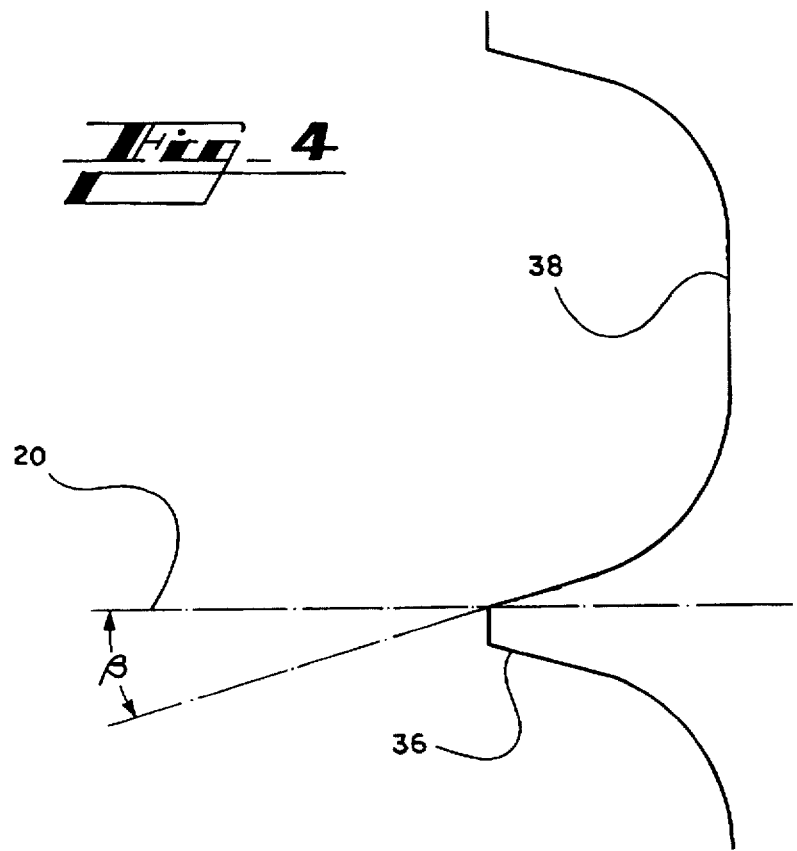
Fig_4

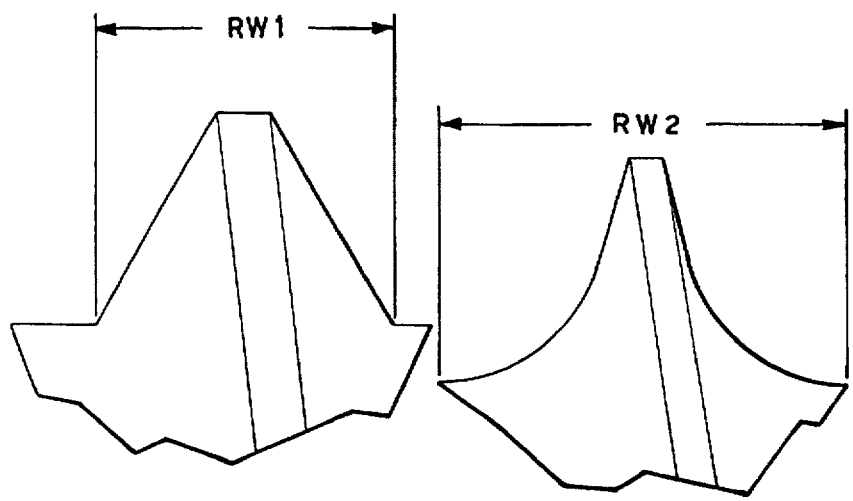
Fig_5
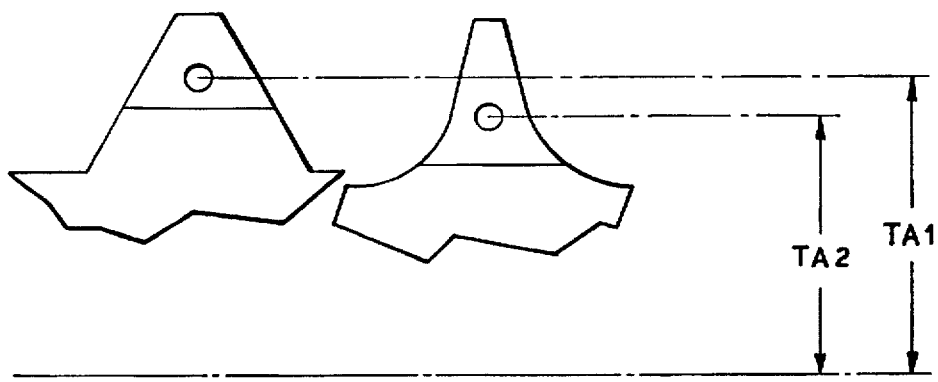
Fig_6
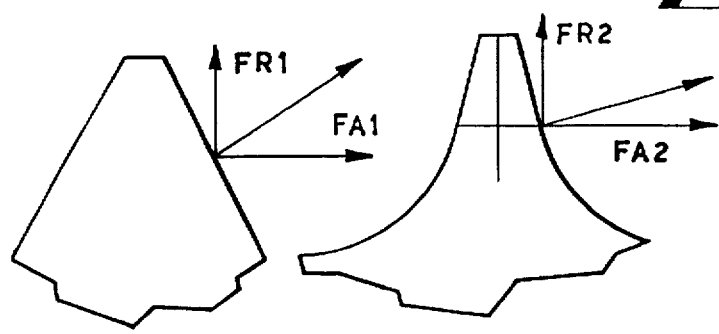
Fig_7

MULTIPLE USE SCREW WITH TAPERED THREADS

FIELD OF THE INVENTION

The present invention generally relates to automotive fasteners, and, more particularly, to a screw for use with both the metal clip nuts and plastic bosses used to fasten door panels, instrument panels, glove boxes and other vehicle components.

BACKGROUND OF THE INVENTION

In automobile manufacturing, fasteners, comprised of a screw and boss or metal clip nut, are used in many applications to secure panels, accessories and other components. Standard industry practice is to form the inner diameter of the plastic boss using a tapered core pin. The core pin taper allows the boss to be ejected from the mold during manufacture. Conventional screws used with the boss exhibit greater penetration at the base of the boss than at the top of the boss because the boss bore narrows at the bottom. This uneven penetration causes higher localized stress at the base of the boss thereby promoting failure.

In some applications, a metal clip nut is used instead of a plastic boss which solves the problem of uneven penetration because the threaded portion of the metal clip nut is not tapered, however, it is desirable to reduce parts by having a single screw for use with both metal clips and plastic bosses. Screws exist that have one set of closely spaced threads adjacent the screw head for metal clip nuts and another set of less closely spaced threads near the screw tip for the plastic boss. Unfortunately, these screws penetrate the plastic boss unevenly. Accordingly, it will be appreciated that it would be highly desirable to a single screw with threads for engaging metal clip nuts and plastic bosses without experiencing uneven penetration.

SUMMARY OF THE INVENTION

The present invention is directed to overcoming one or more of the problems set forth above. Briefly summarized, according to one aspect of the present invention, a screw has a head with a periphery adapted to engage a driving tool, a flange adjacent the head extending beyond the periphery, and a longitudinally extending shaft attached to the head. The shaft has a first lateral dimension adjacent the head, a second lateral dimension at a distal end portion, and a third lateral dimension intermediate the first and second lateral dimensions. The first dimension is greater than the second dimension and equal to the third dimension so that the screw tapers between the second and third lateral dimensions and does not taper between the first and third lateral dimensions.

The sides of the screw taper to match the taper of the inside bore of a plastic boss so that the screw penetrates the boss evenly. The untapered portion of the screw matches the bore of a metal clip nut so that one screw can be used with both metal clip nuts and plastic bosses.

According to another aspect of the present invention, a fastener comprises a boss having a surface and a longitudinally extending tapered opening, and a screw mateable with the tapered opening. The screw has a head adapted to engage a driving tool, a flange adjacent the head extending over the tapered opening of the boss at the surface, and a shaft tapered to match the tapered opening.

Stresses caused by the screw tapping into the boss are evenly distributed because the screw taper matches the taper of the inside bore of the boss. Because stresses are even distributed, the screw does not promote premature failure.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is an elevational view of a preferred embodiment of a screw having tapered sides according to the present invention.

FIG. 2 is a partial sectional view of the screw of FIG. 1 shown engaging a metal clip nut.

FIG. 3 is a partial sectional view of the screw of FIG. 1 shown engaging a plastic boss.

FIG. 4 illustrates the thread profile of the screw of FIG. 1.

FIG. 5 is a comparison of thread root widths for a conventional screw and the screw of FIG. 1.

FIG. 6 illustrates the reduction of thread forming torque for the screw of FIG. 1 compared to a conventional screw.

FIG. 7 is a diagram of forces showing the screw of FIG. 1 and a conventional screw.

DETAILED DESCRIPTION OF THE PREFERRED EMBODIMENTS

Referring to FIG. 1, a screw has a head 10 that is preferably hexagonal to be engaged by a hex-head wrench or other screw driving tool. The head 10 has a flange 12 that rests on one of the two members to be joined when installed to help spread the compressive load. The screw has a longitudinally extending shaft 16 with a vertical axis 18 and a horizontal axis 20.

The shaft has a first lateral dimension, $D_1$, adjacent the head 10, a second lateral dimension, $D_2$, at a distal end portion of the shaft 16, and a third lateral dimension, $D_3$, intermediate the first and second lateral dimensions, $D_1$, $D_2$. The first dimension, $D_1$, is greater than the second dimension, $D_2$, and is equal to the third dimension, $D_3$, so that $D_1 = D_3 > D_2$. The shaft 16 is thus divided into two segments with the first segment extending from the head to the third lateral dimension, $D_3$, and the second segment extending from the third lateral dimension, $D_3$, to the end of the shaft 16. Because the lateral dimensions $D_1$ and $D_3$ are equal, the first segment of the shaft 16 is straight. On the other hand, because lateral dimension $D_3$ is greater than lateral dimension $D_2$, the second segment of the shaft tapers.

Referring to FIGS. 1–3, the amount of the taper depends on the taper of the bore 22 of boss 24 that the screw will engage. The boss 24 has a nontapered opening 26 for receiving the first segment of the shaft 16 which is not tapered. The screw is fitted through the member to be joined 28 and into the boss 24 to secure the member 28 to the boss and the panel, frame or other structure to which the boss is fastened. Where a metal clip nut 30 is used, the first segment of the shaft engages the metal clip nut 30 to secure the member to be joined 32 to the member 34 to which the clip nut 30 is attached.

Again referring to FIG. 1, the screw has a thread length, L, that extends from the bottom of the flange 12 to the bottom of the screw threads 36. The threads 36 are spaced with a helical pitch, P, and are angled from the horizontal at a pitch angle, α. Each side of the screw including the threads tapers by an amount, T, which is equal to the difference between the major diameter, $D_5$, at the transition from the first segment of the shaft to the second segment of the shaft minus the major diameter, $D_4$, at the end of the threads. The taper, T, is designed to match the taper of the inside bore 22 of the boss 24. The pitch is constant throughout the length of the threads unchanging between the first segment of the shaft which contains threads for engaging the metal clip nut 30 and the second segment of the shaft which contains threads for engaging the plastic boss 24.

Referring now to FIG. 4, the major diameter is the diameter measured horizontally from one edge of the threads to the other edge of the threads, while the minor diameter is the distance measured horizontally from one side of the shaft to the other side of the shaft. Preferably, the shaft itself is tapered with the threads untapered giving an overall tapered effect, but it is possible to taper both the shaft and threads as desired. FIG. 4 illustrates the thread profile showing the thread root 38 with the thread 36 extending laterally from the root 38. The thread 36 is shown truncated and the amount of truncation is a function of the root or flank angle, $\beta$, and major diameter. The root flank angle $\beta$ is the angle that makes with the horizontal.

It will be now appreciated that there has been presented a screw that combines the optimum thread characteristics of plastic tapping screws and metal tapping screws into one thread profile. The screw can replace several screw designs now commonly used in vehicle interiors thereby reducing design complexity and commonizing to one torque specification. The taper matches the inner draft angle of the boss to prevent excessive hoop stress in the molded boss at the base of the boss. The taper improves tensile load distribution throughout the engaged length of the screw. It increases material flow between the screw and boss inner diameter which reduces internal stress/localized stress concentration on the boss to reduce cracking.

The screw has two different thread profiles. The first four threads are designed for metal/nut hole or other nondeformable material applications and the remaining threads are designed for thermoplastic, thermoset, aluminum extrusion, and wood hole applications. The root diameter of the first four threads is larger than the remaining threads to withstand higher torsional loads when fastened into a metal clip nut. The remaining screw threads are tapered to match the tapered profile of the inner diameter of the boss. The threads have a radius between the pitch of the threads with a flank angle, $\beta$, to maintain maximum strength without compromising performance for wood and plastic applications. The flank angle gives optimum penetration into the boss resulting in the highest resistance to stripping and pullout because the material movement improves clamp load retention. The concave shape of the root diameter provides an area for movement to relieve the internal stress of the threaded material. The radii of the root diameter and smooth transitions reduce localized stress in the manufacturing of the screw. The root radiuses improve torsional strength. They also provide an increase in the thread root width thus increasing the resistance to thread shear under fastener clamp and service loads as illustrated in FIG. 5. FIG. 5 compares a conventional 60° thread root width, RW1, with the new variable use screw root width, RW2, which is about 43% larger. The absence of a sharp transition into the screw core eliminates the notch sensitivity present in conventional self tapping screw threads.

FIG. 6 illustrates the reduction of thread forming torque with the new screw. The torque arm, TA1, for a conventional 60° thread is displaced farther from the centerline of the screw and is therefore longer than the torque arm, TA2, for the variable use screw. This reduction in the length of the torque arm of the variable use screw reduces the rotational torque required to displace the same volume of nut material as the 60° thread form making the variable use screw easier to insert.

FIG. 7 is a diagram of forces showing the variable use screw thread force and stress reduction. In the diagram, the radial forces, FR1, FR2, are the forces that create the boss burst stress. The radial force for the variable use screw, FR2, is about 54% less than the radial force of the 60° thread, FR1. For an axial force FA2 of 250 lbs, the new screw produced a radial force of only 67 lbs which is in sharp contrast to the 60° thread that produced a 144 lb radial force for a 144 lb axial force.

The 15 degree tip thread flank angle produces favorable conditions when threading the screw into the plastic boss which reduces internal stress. The tip thread flank angle of 15 degrees provides higher loading in the metal clip nut by reducing the horizontal component of reaction force. This increases clamp load for a given torque as well as reducing clamp load loss.

The screw may be manufactured in different sizes. One screw has an 18.0 mm length which proves to be the optimum length for both metal and nonmetal automotive applications. The nonmetal tapered length equates to an engagement length that is equal to or in excess of 2.5 times the outside diameter of the screw. This is the criteria that allows the screw to be torqued to its ultimate torsional strength without failing the plastic boss in a thread stripping failure mode. Typical screw diameter to length of thread axial engagement ratios are 2.5 to 3.0. The 18.0 mm screw has a 1.6 mm thread pitch and a 9.0 degree helix which allows the screw to be installed into material at a fast rate with little internal stress generated.

The thread helix angle is at 9 degrees to prevent loosening due to heat cycling within the vehicle interior. It is known that screws used in plastic materials with high helix angles associated with twin lead threads loose clamp load when tightened to a relatively high torque due to torsional twisting at maximum drive torque. When torque is removed, the screw unwinds and partially rotates in reverse with consequent loss of clamp load. The tapered core of the multiple use screw increases the torsional strength of the screw near the head of the screw where the maximum torsional stress occurs.

Operation of the present invention is believed to be apparent from the foregoing description and drawings, but a few words will be added for emphasis. The screw is installed with a hex head wrench and torqued. Where a metal clip nut is used, the first four screw threads engage the nut, and where a plastic boss is used, the remaining threads engage the tapered bore of the boss. The thread pitch ensures fast installation while the flank angle prevents loosening. The thread taper promotes even penetration without splitting the boss. Stresses caused by the screw tapping into the boss are evenly distributed because the screw taper matches the taper of the inside bore of the boss. Because stresses are even distributed, the screw does not promote splitting of the boss, premature failure or loosening of the screw.

While the invention has been described with reference to vehicle components, it is apparent that the invention is easily adapted to other components to be fastened to one another. While the invention has been described with particular reference to a preferred embodiment, it will be understood by those skilled in the art that various changes may be made and equivalents may be substituted for elements of the preferred embodiment without departing from invention. For example, the flank angle may be changed for applications where heat and vibration are not prevalent, and the helix angle may be changed to change installation speed. In addition, many modifications may be made to adapt a particular situation and material to a teaching of the invention without departing from the essential teachings of the present invention. It is accordingly intended that the claims shall cover all such modifications and applications as do not depart from the true spirit and scope of the invention.

What is claimed is:

1. A screw, comprising:

a head having a periphery adapted to engage a driving tool;

a flange adjacent said head extending beyond said periphery;

a longitudinally extending shaft attached to said head having a first shaft segment adjacent said head and a second shaft segment adjacent said first shaft segment and distal from said head, said shaft having a first lateral dimension adjacent said head, a second lateral dimension at a distal end portion of said second shaft segment, and a third lateral dimension intermediate said first and second lateral dimensions at a junction of said first and second shaft segments, said first dimension being greater than said second dimension and equal to said third dimension so that said second shaft segment tapers between said second and third lateral dimensions and said first shaft segment does not taper between said first and third lateral dimensions; and a set of threads on said shaft having a helical pitch of about nine degrees and forming a flank angle of about fifteen degrees relative to a horizontal axis of said shaft, said pitch and said flank angle of said threads remaining constant throughout the length of said threads unchanging between said first segment of said shaft which contains threads for engaging a metal clip nut and said second segment of said shaft which contains threads for engaging a plastic boss.

2. A screw, as set forth in claim 1, wherein said threads have a uniform helical pitch of about nine degrees to maximize installation speed while minimizing internal stress.

3. A screw, as set forth in claim 2, including a simple radius between said pitch of said threads creating a concave root diameter to provide an area for material movement to improve clamp load retention.

4. A screw, as set forth in claim 1, wherein said threads are truncated displacing a torque arm closer to a longitudinal centerline of said screw thereby reducing said torque arm and reducing rotational torque required to displace material making screw insertion easier.

5. A screw, as set forth in claim 1, wherein a ratio of a thread root diameter to a thread crest diameter remains constant throughout the length of said threads.

6. A screw, comprising:

a head having a periphery adapted to engage a driving tool;

a flange adjacent said head extending beyond said periphery; and a longitudinally extending shaft attached to said head and having a first lateral dimension adjacent said head and a second lateral dimension at a distal end portion, said first dimension being greater than said second dimension so that said screw tapers between said first and second lateral dimensions to improve tensile load distribution during engagement of the length of said screw; and a set of threads on said shaft having a constant helical pitch of about nine degrees and forming a flank angle of about fifteen degrees with a curved transition from thread to shaft to eliminate notch sensitivity, and having a constant thread depth with a root diameter of first four threads adjacent said head being larger than remaining threads for increased torsional load strength.

* * * * *